United States Patent [19]

Shores

[11] Patent Number: 4,561,183
[45] Date of Patent: Dec. 31, 1985

[54] TRACING AID FOR COMPUTER GRAPHICS

[75] Inventor: Marvin W. Shores, Pomona, Calif.

[73] Assignee: General Dynamics Pomona Division, Pomona, Calif.

[21] Appl. No.: 633,566

[22] Filed: Jul. 23, 1984

[51] Int. Cl.⁴ .............................................. G08C 21/00
[52] U.S. Cl. ...................................... 33/1 M; 178/18; 340/710; 33/18.1
[58] Field of Search ................. 33/1 M, 18 R, 20 R, 33/20 B, 23 B, 23 H, 27 F, 28, 430, 448, 488; 340/706, 710; 178/18, 20

[56] References Cited

U.S. PATENT DOCUMENTS

| | | | |
|---|---|---|---|
| 2,168,048 | 8/1939 | Skellett | 178/20 |
| 2,168,049 | 8/1939 | Skellett | 178/20 |
| 2,269,599 | 1/1942 | Moodey | 178/18 |
| 2,498,649 | 2/1950 | Clark | 178/18 |
| 2,586,160 | 2/1952 | Handel | 178/18 |
| 2,617,587 | 11/1952 | Carpenter | 235/61 |
| 2,829,274 | 4/1958 | Schreck | 250/106 |
| 2,889,627 | 6/1959 | Culpepper et al. | 33/1 |
| 3,541,541 | 11/1970 | Engelbari | 340/710 |
| 3,696,397 | 10/1972 | Raser | 178/18 |
| 3,792,243 | 2/1974 | Appel et al. | 235/151 |
| 3,909,947 | 10/1975 | Voth et al. | 33/236 |
| 4,318,096 | 3/1982 | Thornburg et al. | 340/706 |
| 4,331,954 | 5/1982 | Bauman et al. | 340/706 |
| 4,364,035 | 12/1982 | Kirsch | 340/710 |
| 4,404,865 | 9/1983 | Kim | 340/710 |
| 4,419,672 | 12/1983 | Hiro | 178/18 |

Primary Examiner—Willis Little
Attorney, Agent, or Firm—Henry M. Bissell; Edward B. Johnson

[57] ABSTRACT

A graphic aid device is disclosed which may be used with computers having a mouse-type computer cursor controller. The device provides a specific geometric orientation to the mouse, thereby enabling a tracing member attached onto or near the mouse to be used to manually trace complex figures while simultaneously and accurately transferring the complex figures to the computer memory. The device of the present invention utilizes a drawing machine arm to maintain a specific geometrical relationship of the mouse with respect to the surface over which the mouse is moved to trace the complex figure.

31 Claims, 8 Drawing Figures

TRACING AID FOR COMPUTER GRAPHICS

BACKGROUND OF THE INVENTION

1. Field of the Invention

The present invention relates generally to a device for use with a computer for manual tracing of complex graphic curves and profiles from a drawing or the like which are simultaneously transferred into computer memory and, more particularly, to a device for use with a standard computer display controller to enable highly accurate translation of such complex curves and profiles from a drawing or photograph into computer memory.

2. Description of the Prior Art

With the proliferation of relatively inexpensive personal computers has come a strong demand for accessories for these computers enabling them to be used for an increasing number of tasks. Whether the application is for computer-aided design, complex mathematical analysis, or more mundane applications such as copying a drawing or a picture for display on a computer monitor, a popular activity with such personal computers is the transfer of a complex curve or profile from a drawing or photograph directly into computer memory by means of manually tracing the curve or profile from the drawing or photograph.

There are basically three types of devices which are capable of manually translating curves and profiles from a sheet of paper to the computer memory for filing, display, or printout, and these systems are the dedicated resolving system, the tablet type drawing system, and a computer cursor controller known as a "mouse".

The first of these types of systems, the dedicated resolving system, has been around for some time, and is illustrated by U.S. Pat. No. 2,889,627, to Culpepper et al, and more recently by U.S. Pat. No. 4,331,954, to Bauman et al. The dedicated resolving system typically includes a complex electromechanical linkage system mounted on a tracing board and requires a complex sysem interface between the resolving system and the computer. Such systems are simply not practical for the use contemplated herein due to their high purchase price, which is easily several times the cost of the entire personal computer system.

The second type of system is the tablet type system, which is illustrated by U.S. Pat. No. 4,318,096, to Thornburg et al, as well as by U.S. Pat. No. 2,586,160, to Handel. The tablet type system may include either a small, portable tablet having an electrically sensitive surface or a larger, dedicated electrical table surface in which a curve or shape is inputted by use of a dedicated electrical pen. Various adaptations of this system exist, including those in which the user's finger may be used instead of a pen, as well as those systems utilizing light pen or torch screens.

The main drawbacks of such systems is that they are generally not very accurate unless they are also quite expensive. In addition, the use of such systems to trace curves or profiles from a drawing or photograph rather than directly on the tablet would either be substantially difficult or completely impossible, depending on the system. It is therefore evident that the tablet type system is not a practical solution to the unique requirements of the present design problem.

A third type of system experiencing rapidly increasing popularity utilizes a computer cursor controller device known as a "mouse". A mouse is a pointing device generally for use with a visual display system or printout, and a transducer contained in the mouse converts translational motion of the mouse housing into a position signal which controls the movement of a cursor visually displayed on the computer monitor. By moving the mouse over a flat surface in the desired direction, the cursor will precisely follow the translation of the mouse.

The mouse typically contains a switch which is utilized to initiate a particular desired function. One of the functions personal computers are capable of performing with the mouse is generally known as the "paint" function. This function allows the computer operator to sketch images on the monitor by simply moving the mouse over the flat surface in the desired direction or directions, thereby making the mouse in effect a sort of pencil with which a drawing may be made to appear on the monitor. One such system also provides the capability of "drawing" straight lines and predefined curves and shapes on the monitor screen, according to shapes which are stored in the computer. However, this system is not able to reproduce complex curves and shapes with the accuracy that is desired.

It will be appreciated that the translation of complex curves and shapes from paper images to computer images is numerically very difficult to accomplish with any degree of accuracy, and the mouse has therefore become a popular device for performing such a function. The mouse typically contains a rotating ball and two optical sensors translating movements of the mouse to electrical signals to drive the cursor in the direction the mouse is moved. Another type of mouse utilizes only optical sensing of a grid-marked surface, but this type of mouse (which is shown in U.S. Pat. No. 4,364,034, to Kirsch) requires a grid-marked surface, which requirement may not be practical when copying figures on drawings or photographs.

Although the mouse goes a long way toward satisfying the need for a device enabling the translation of a complex image from a drawing to a computer, the mouse unfortunately has an inherent deficiency which makes highly accurate tracings of complex curves and profiles virtually impossible. This is inherent in the conventional use of the mouse, because the part of the mouse which acts as the actual pointer is the ball, which is centrally located underneath the mouse. It may immediately be appreciated that since the actual pointer of the mouse is underneath and in the center of the mouse, it is very difficult to trace with any degree of accuracy a curve or shape by moving the ball directly over the counter of the curve or shape.

A point on the side edge of the mouse can be used as the pointer, but since this location is offset from the ball of the mouse, which is the actual pointer, tracing done using this edge point will not be accurate unless the mouse is maintained in a fixed directional orientation while it is moved along the contours of the curve or drawing. What this means is that if the racing is commenced with the mouse pointed directly toward the top of the paper, the mouse must remain pointing directly toward the top of the paper while the tracing is manually performed. Failure to so orient the mouse will result in substantial error in the traced copy stored in the computer memory.

It may therefore be appreciated that there exists a substantial need for a device for use with the mouse which will automatically maintain the mouse in the desired orientation while the tracing process is carried out. The device must not get in the way of the tracing operation, and it must be adaptable to fit a presently existing mouse to avoid obsoleting all such devices sold prior to the existence of the present invention. This design, which will enable highly accurate tracings to be made with any mouse-computer combination, should also be inexpensive in order to afford the broadest possible market to personal computer owners.

SUMMARY OF THE INVENTION

The present invention is a tracing aid device for use with a standard mouse, which device provides a fixed orientation for the mouse while a tracing operation is performed. The invention utilizes a captive mechanisms substantially identical to the arm of a classic drawing or drafting machine used to maintain selected angles on a straight edge used to make drawings on a drafting table. The device is clamped onto the edge of a table, and a mouse is inserted into a receiving end of the arm located opposite the end clamped to the table in place of straight edges. Tracing means such as a pointer may be attached either to the mouse or to the receiving end of the drawing arm, the position of the pointer being an arbitrary choice designed primarily for the convenience of the user.

It may therefore be appreciated that, with such an arrangement, the mouse will be maintained in a fixed orientation while it is moved over the surface of the table, thereby causing the contour followed by the pointer to be exactly copied into the memory of the computer. In spite of the extraordinary accuracy of this device and the fact that it may be used with virtually any mouse and any personal computer interfacing with a mouse, it may be produced relatively simply and with a fairly low cost, thereby making it an inexpensive component which may be cheaply purchased by the large number of personal computer users. The device enables the mouse to be used to copy drawings, complex shapes, and photographs, and will find use in a large number of applications both in the home and in business operations.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

Figures 1, 2:
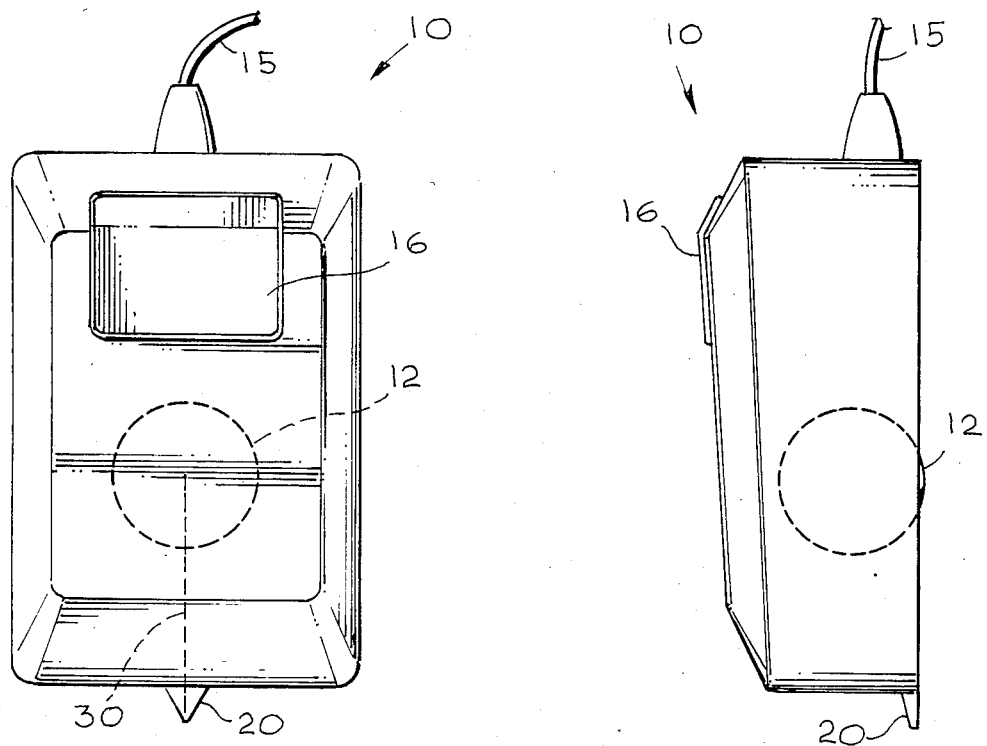
FIG. 1 is a plan view of a standard computer mouse, showing the ball which is the actual pointer of the mouse in phantom lines, with the contact point of the ball connected by a phantom line to a pointer for use with the present invention, which has been added to the mouse.
FIG. 2 shows the mouse of FIG. 1 in side view.

A typical mouse 10 is shown in FIGS. 1 and 2. As mentioned above, translational motion of the mouse 10 over a flat surface causes movement of a ball 12, which movement is converted by a transducer inside the mouse 10 into a position signal supplied to a computer through a cord 15, which position signal typically controls movement of a cursor on a video monitor driven by the computer. The mouse 10 contains a button 16, which is used to select particular desired functions generally listed on the video monitor.

It will therefore be appreciated that the actual pointer of the mouse 10 is the point of contact between the surface of the ball 12 and the flat surface on which the mouse device 10 is being moved. The mouse 10 shown in FIGS. 1 and 2 is entirely a standard device, with the exception of the addition of a pointer 20, which may be adhesively attached to the side edge of the mouse 10. The actual location of the pointer 20 at the location illustrated in FIGS. 1 and 2 is arbitrary, as will be further explained below.

The geometric relationship between the location of the actual pointer of the mouse 10 and the pointer 20 is defined by a line 30 therebetween. Elementary geometric principles hold that maintaining orientation of the line 30 in a fixed direction while moving the mouse 10 over a flat surface will cause movement of the actual pointer of the mouse 10 (defined by the intersection between the ball 12 and the flat surface) and movement of the pointer 20 to exactly correspond. Therefore, if the line 30 is kept in the specific geometric orientation while the mouse 10 is moved over the flat surface, movement of the pointer 20 along a curve or profile will result in that curve or profile being reproduced exactly in the memory of the computer and on the video display.

Figure 3:
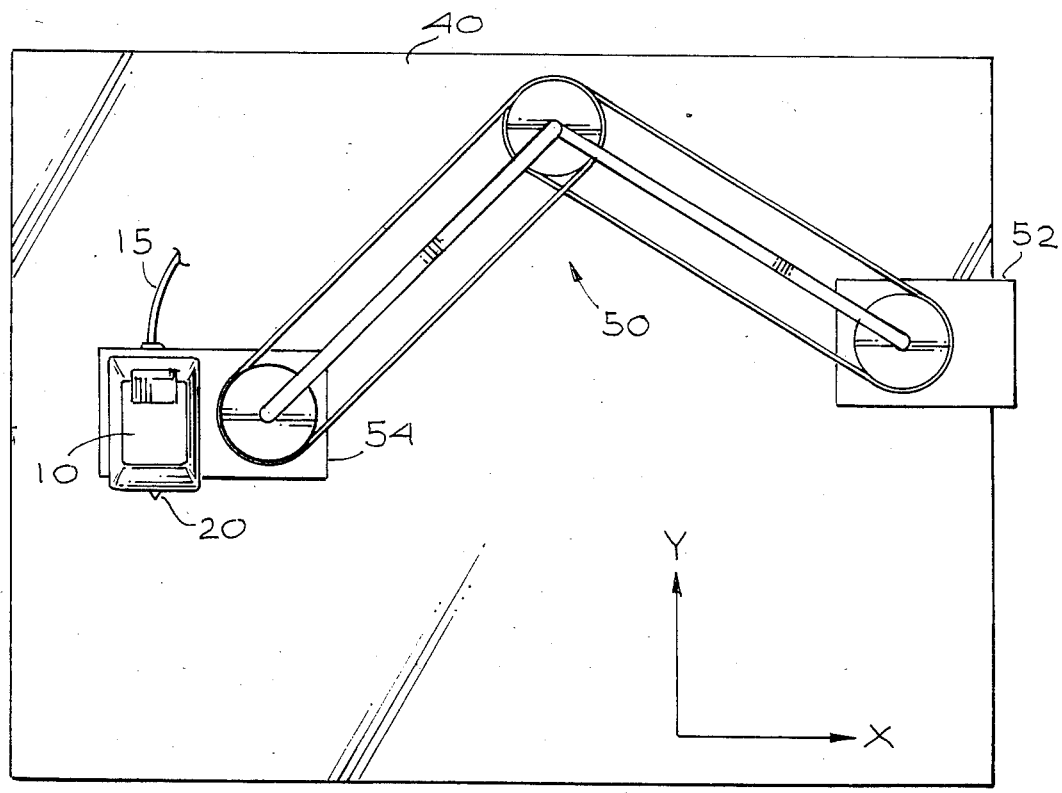
FIG. 3 illustrates the present invention clamped to a table at one end, and containing the mouse of FIGS. 1 and 2 in the other end.

Another way of summarizing this relationship is by considering the flat surface to be defined by two orthogonal lines, for example X and Y axes of FIG. 3. The line 30 will be kept in a unique angular relationship with the two orthogonal lines, thereby causing the tracing of a complex curve or profile to result in the complex curve or profile being exactly reproduced in the computer memory and on the video monitor.

Referring now to FIG. 3, the mouse 10 shown in FIGS. 1 and 2 is shown mounted in a specific geometric orientation above a flat surface provided by a table or drawing board 40. It will be appreciated that the specific geometric orientation shown in FIG. 3 has the line 30 (FIG. 1) of the mouse 10 moving in a parallel relationship with the Y-axis of the table 40, although other geometric relationships are possible. The only requirement is that the specific geometric relationship of the line 30 (FIG. 1) of the mouse 10 be maintained parallel with respect to a line contained in the surface of the table 40 (and therefore maintain unique angular relationships with the two orthogonal lines defined by the X and Y axes.)

In one preferred embodiment of the present invention, a drawing arm 50 of the mechanical linkage type is used to maintain this geometric relationship, the drawing arm 50 being of standard design which is well known in the art. The drawing arm 50 is supported from the table 40 at one end by a mounting bracket 52, which is securely fastened to the edge of the table 40.

At the other end of the drawing arm 50 is a receiving bracket 54 adapted to receive the mouse 10 in a manner allowing the ball 12 of the mouse 10 (FIGS. 1 and 2) to rest on the flat surface of the table 40. Due to the operation of the drawing arm 50, the receiving bracket 54 and the mouse 10 may be freely moved over the surface of the table 40 in the X direction, the Y direction, or any combination thereof. Throughout the locus of such movement of the mouse 10 over the surface of the table 40, the specific geometric orientation of the mouse 10 will be maintained constant by the drawing arm 50.

It should be noted at this point that the drawing arm 50 may be fixedly oriented to the table 40 by the mounting bracket 52 being mounted at any location about the table 40, preferably at a location making movement of the mouse 10 convenient for the user of the device. As mentioned above, the location of the pointer 20 on the outside edge of the mouse 10 as shown in FIGS. 1-3 is entirely arbitrary, although it is felt that the location at the side of the mouse 10 facing the user of the device will be the most convenient location for the pointer 20. The pointer 20, however, could be mounted at other locations on the mouse 10, or also at any location on the edge of the receiving bracket 52, or indeed on the receiving bracket 52 itself, should it be made of a transparent material. It will be appreciated that the only necessary requirement for the location of the pointer 20 is that it be referenced in a fixed position with respect to the actual pointer of the mouse 10, namely the contact point of the ball 12 with the flat surface of the table 40. Therefore, a line 30 drawn from this actual pointer to the pointer 20 will always be maintained in a parallel relationship to a line running through the surface of the table 40, and at unique angular positions relative to the X and Y axes.

Figure 4:
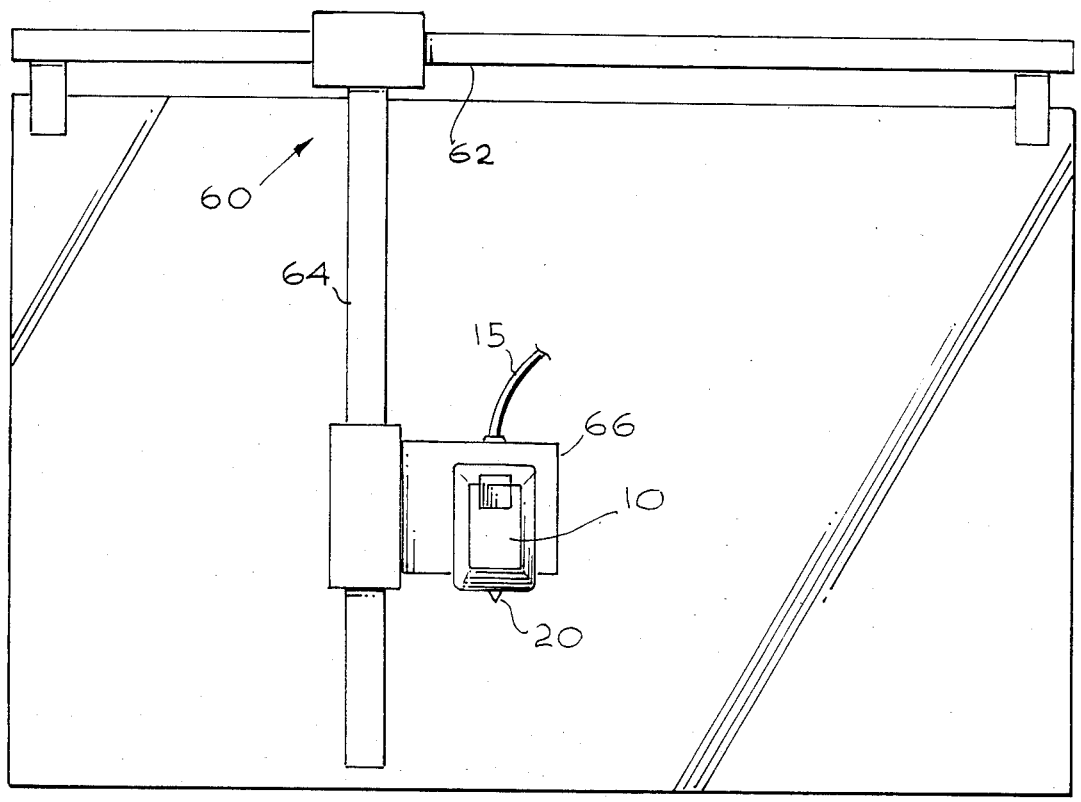
FIG. 4 depicts an alternative embodiment of the present invention using a different type of drawing machine arm.

An alternative embodiment of the present invention is shown in FIG. 4, using a different type of drawing or drafting machine arm 60 consisting of vertical and horizontal bars. A horizontal bar 62 is mounted on the top edge of the table 40, and a vertical bar 64 slides back and forth on the horizontal bar 62. The receiving bracket 66 slides up and down on the vertical bar 64, and therefore is free to move over the flat surface of the table 40, while being restrained from angular movement with respect to the X and Y axes. This embodiment operates in a similar manner to the embodiment shown in FIG. 3, but is generally more expensive to manufacture.

Figure 5:
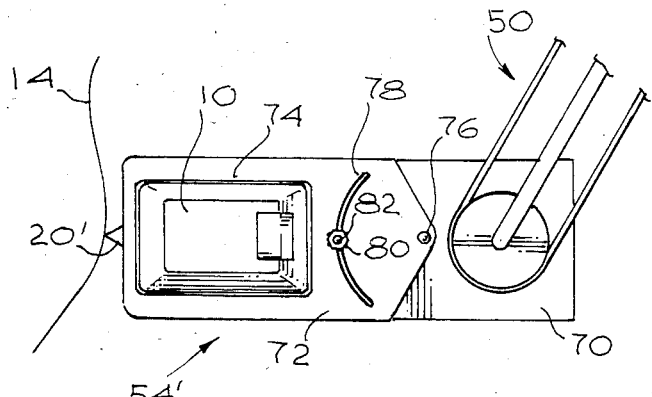
FIG. 5 shows a variation of the arrangement of FIG. 3.

FIG. 5 shows a portion of the arrangement of FIG. 3 with the receiving bracket 54' modified to allow some variation of the orientation of the mouse 10 for the convenience of the user in following the line 14. Also, in this arrangement, the pointer 20' is affixed to the receiving bracket 54' instead of directly to the mouse 10.

As shown in FIG. 5, the receiving bracket 54' comprises a base plate 70 and an adjustable plate 72. The base plate 70 is fixedly mounted to the drawing arm 50 in the manner of mounting the receiving bracket 54 in FIG. 3. The mouse 10 is oriented in the position shown, nested within a receiving opening 74 in the adjustable plate 72. The adjustable plate 72 is pivotably mounted to the base plate 70 by a pin 76. A slot 78 permits rotation of the adjustable plate 72, within limits, about the pivot pin 76. When adjusted to the desired position relative to the base plate 70, the plate 72 is locked in position by tightening a knurled nut 80 which is mounted on a threaded stud 82 extending from the base plate 70. This arrangement allows the user to adjust the plate 72 relative to the base plate 70 in order to minimize the degree to which a curve or line being followed is covered up by the receiving bracket 54'. This adjustment would be set in the beginning of any curve tracing operation and would not be changed during the entry of the traced curve configuration into the computer. After setting the position of the adjustable plate 72 relative to the base plate 70, the reference point for the curve could be entered into the computer, if desired, merely by moving the pointer 20' to that point and pressing the switch button on the mouse 10.

Figure 6:
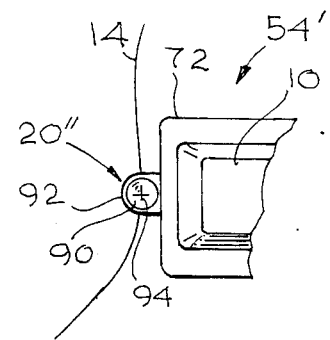
FIG. 6 illustrates a variation of the device of FIG. 5.

FIG. 6 shows a variation of the arrangement of FIG. 5 in which a tracing element 20" having a lens 90 is mounted on the receiving bracket 54' instead of the pointer 20'. As shown in FIG. 6, the lens 90 is mounted in a lens holder 92 and has a pair of cross hairs 94 for locating the line 14 with greater precision.

Figure 7A:
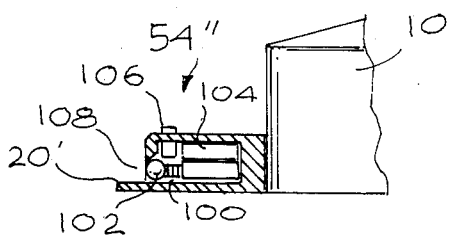
FIGS. 7A and 7B show further modifications in the device of the invention.
Figure 7B:
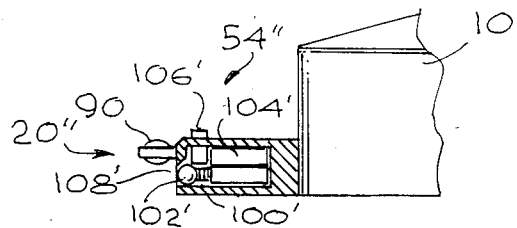

Devices in accordance with the present invention may also be provided with a small light, as shown in FIGS. 7A and 7B, to illuminate the section of the line 14 in the immediate vicinity of the tracing element. FIG. 7A shows the bracket 54" in partial sectional view as having a cavity 100 in the housing adjacent the pointer 20'. The cavity 100 is shown containing a bulb 102, a pair of dry cells 104, and a switch 106. An aperture 108, preferably covered with a thin piece of transparent plastic, permits light from the bulb 102 to illuminate the optical field in the immediate vicinity of the pointer 20'.

A corresponding arrangement for the tracing lens arrangement 20" of FIG. 6 is depicted in FIG. 7B, wherein a bulb 102', cells 104' and switch 106' are mounted within a cavity 100', from which light may emanate through the aperture 108' to illuminate the area immediately underneath the lens 90 in which the line being traced is positioned.

The present invention may be adapted for installation on virtually any table, and for use with any commercially available mouse. The present invention affords a highly accurate transfer of a complex curve, profile or other complex figure from a drawing or photograph to the memory of a computer, or to a video display or a dot matrix or other type of printout. The simple design of the present invention utilizing the principles of the classic drawing machine arm make the present invention relatively inexpensive to manufacture, and therefore a highly affordable accessory for use with personal computers having a mouse. This highly accurate translation device will find substantial use in commercial as well as domestic environments, and represents a significant improvement over previously known translation devices.

Although there have been described above specific arrangements of a tracing aid for computer graphics in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A tracing aid for use with a computer mouse to enable the use of said mouse in inputting a complex curve or profile from a drawing or photograph into a computer, comprising:

means for receiving said mouse, said receiving means holding said mouse for movement on a flat surface defined by two orthogonal lines;

said mouse being a translatable device including means for generating signals for application to a computer which are indicative of the instantaneous relative position of a point which is generally centrally located underneath the mouse and movable therewith;

means coupled to the receiving means and attachable to the flat surface for maintaining the angular attitude of said mouse with respect to said two orthogonal lines as said mouse moves over said flat surface; and tracing means mounted in a predetermined fixed position relative to said point which is displaced laterally therefrom, said tracing means being movable with said mouse for manually tracing the locus of said complex curve or profile from said drawing or photograph to simultaneously input the locus of said complex curve or profile from the mouse into said computer.

2. A tracing aid as defined in claim 1 wherein said attitude maintaining means comprises a drawing machine arm having a first end and a second end, said first end being fixedly mounted onto said flat surface, said second end being connected to said receiving means, said drawing machine arm allowing movement of said receiving means and said mouse over said flat surface, said drawing machine arm maintaining the angular attitude of said receiving means and said mouse with respect to said two orthogonal lines.

3. A tracing aid as defined in claim 1 wherein said attitude maintaining means comprises a horizontal bar attached to and parallel to an edge of said flat surface; and a vertical bar slidably mounted onto said horizontal bar, said vertical bar extending over said flat surface, said receiving means being slidably mounted on said vertical bar, said horizontal and vertical bars maintaining the angular attitude of said receiving means and said mouse with respect to said two orthogonal lines.

4. A tracing aid as defined in claim 1 wherein said receiving means comprises a receiving bracket mechanically coupled to said attitude maintaining means, said receiving bracket supporting said mouse in an operating position on said flat surface.

5. A tracing aid as defined in claim 4 wherein said receiving bracket secures said mouse from movement relative to said receiving bracket.

6. A tracing aid as defined in claim 4 wherein said receiving bracket comprises an angularly fixed support plate and an adjustable plate which is angularly adjustable relative to the fixed plate.

7. A tracing aid as defined in claim 6 further including means for locking the adjustable plate in a selected angular position relative to the fixed plate.

8. A tracing aid as defined in claim 7 wherein the mouse is retained within the receiving bracket and the tracing means comprises a pointed affixed to the adjustable plate.

9. A tracing aid as defined in claim 8 further including a pivot pin mounting the adjustable plate to the fixed support plate.

10. A tracing aid as defined in claim 1 wherein said tracing means comprises a pointer fixedly mounted with respect to said mouse just above said flat surface, said pointer including a unique location on said pointer for closely following said complex curve or profile, thereby causing said mouse to precisely input said complex curve or profile to said computer.

11. A tracing aid as defined in claim 10 wherein said mouse point and said unique location of said fixedly mounted pointer define a line maintaining said constant angular position with respect to said two orthogonal lines.

12. A tracing aid as defined in claim 11 wherein said tracing means comprises a pointer mounted on an edge of said mouse.

13. A tracing aid as defined in claim 11 wherein said tracing means comprises a pointer mounted on said receiving means.

14. A tracing aid as defined in claim 1 wherein said tracing means comprises a lens mounted adjacent the receiving means for framing a segment of the line being followed, the lens having a pair of cross hairs for assisting the user to follow the line precisely.

15. A tracing aid as defined in claim 14 further including a self-contained light source for illuminating the segment of the line beneath the lens.

16. A tracing aid as defined in claim 10 further including a self-contained light source for illuminating the pointer and a surface area adjacent thereto.

17. A tracing aid for use with a computer mouse to input a complex curve or profile into a computer from a drawing or photograph, comprising:

a receiving bracket for holding said mouse fixed relative to the bracket while allowing said mouse to rest and move freely on a flat surface defined by two orthogonal lines;

said mouse being a translatable device having a rotatable ball constituting the point of contact between the mouse and said surface and further including means for generating signals for application to a computer which are indicative of the instantaneous relative position of said point of contact;

a tracing means mounted in a fixed position relative to said mouse and above said flat surface, said tracing means being displaced laterally from said point of contact and so located and configured as to enable the mechanical tracing of a complex curve or profile on a drawing or photograph located on said flat surface; and means for maintaining said mouse and said receiving bracket in a constant preset angular relationship with respect to said two orthogonal lines defining said flat surface while said mouse and said receiving bracket move on said flat surface.

18. A tracing aid as defined in claim 17 wherein said tracing means comprises a pointer mounted on said receiving bracket.

19. A tracing aid as defined in claim 18 wherein said pointer is of generally triangular shape, one corner being used to follow said complex curve or profile.

20. A tracing aid as defined in claim 17 wherein said tracing means comprises a lens mounted on the receiving bracket for enlarging a portion of the curve or profile being traced.

21. A tracing aid as defined in claim 17 wherein said maintaining means comprises a mechanical drawing arm fixed at one end thereof, and providing at the other end thereof said constant preset angular relationship.

22. A tracing aid as defined in claim 17 wherein said maintaining means comprises a mechanical drawing mechanism using orthogonal vertical and horizontal bars to maintain said constant preset angular relationship.

23. A tracing aid for use with a computer mouse to input a complex curve or profile into a computer from a drawing or photograph, comprising:
- a receiving bracket for holding said mouse fixed relative to the bracket while allowing said mouse to rest and move freely on a flat surface defined by two orthogonal lines;
- a tracing means mounted in a fixed position relative to said mouse and above said flat surface, said tracing means being so located and configured as to enable the mechanical tracing of a complex curve or profile, on a drawing or photograph located on said flat surface;
- means for maintaining said mouse and said receiving bracket in a constant preset angular relationship with respect to said two orthogonal lines defining said flat surface while said mouse and said receiving bracket move on said flat surface; and
- means for illuminating a portion of the curve or profile being traced in the vicinity of the tracing means.

24. A tracing aid for use with a computer mouse to enable the entry into a computer of a complex curve or profile by manually tracing said complex curve or profile comprising, in combination:
- a computer mouse in the form of a translatable device including means for generating signals for application to a computer which are indicative of the instantaneous relative position of a point which is generally centrally located underneath the mouse and movable therewith;
- a drawing arm having means for selectively mounting at a first end thereof on a table or other flat surface, said drawing arm having a second end with two degrees of freedom of movement allowing said second end of said drawing arm to move freely over the surface of said table;
- a receiving bracket mounted at said second end of said drawing arm, said receiving bracket moving freely with said second end of said drawing arm over the surface of said table, said drawing arm maintaining a preset angular relationship to said table whereby a line contained in said receiving bracket and parallel to a line in the surface of said table will remain parallel to said line in the surface of said table as said receiving bracket and said second end of said drawing arm are moved over the surface of said table, said receiving bracket being adapted to hold said mouse fixedly therein while allowing said mouse to remain in contact with the surface of said table as said mouse, said receiving bracket, and said second end of said drawing arm move together over the surface of said table, said mouse being maintained in a particular orientation with respect to said table as said mouse moves over the surface of said table; and
- tracing means comprising a pointer fixedly attached to one of said mouse and said receiving bracket at a position displaced laterally from said mouse point, said pointer being located over the surface of said table for following the locus of said complex curve or profile to manually input said locus into said computer corresponding to the signals generated by the mouse.

25. A tracing aid for use with a computer mouse to enable the entry into a computer of a complex curve or profile by manually tracing said complex curve or profile, comprising:
- a drawing arm for selectively mounting at a first end thereof on a table or other flat surface, said drawing arm having a second end with two degrees of freedom of movement allowing said second end of said drawing arm to move freely over the surface of said table;
- a receiving bracket mounted at said second end of said drawing arm, said receiving bracket moving freely with said second end of said drawing arm over the surface of said table, said drawing arm maintaining a preset angular relationship to said table whereby a line contained in said receiving bracket and parallel to a line in the surface of said table will remain parallel to said line in the surface of said table as said receiving bracket and said second end of said drawing arm are moved over the surface of said table, said receiving bracket being adapted to hold said mouse fixedly therein while allowing said mouse to remain in contact with the surface of said table as said mouse, said receiving bracket, and said second end of said drawing arm move together over the surface of said table, said mouse being maintained in a particular orientation with respect to said table as said mouse moves over the surface of said table;
- tracing means comprising a pointer fixedly attached to one of said mouse and said receiving bracket, said pointer being located over the surface of said table for following the locus of said complex curve or profile to manually input said locus into said computer; and
- means for illuminating the surface area in the vicinity of the tracing means.

26. A tracing aid as defined in claim 24 wherein said drawing arm is removably mounted on said table or other flat surface for portability, and said mouse may be removed from said receiving bracket for use without said tracing aid.

27. A method of translating a complex curve or profile from a drawing or photograph into a computer, comprising the steps of:
- mounting one end of a mechanical drafting machine arm onto a table or other flat surface defined by two orthogonal lines;
- providing a receiving bracket on the other end of said mechanical drafting machine arm, said receiving bracket maintaining a fixed angular relationship with respect to said two orthogonal lines defining said flat surface as it is moved over said surface;
- mounting a computer mouse fixedly on said receiving bracket to allow said mouse to rest on said flat surface and to move freely with said receiving bracket on said flat surface while generating signals corresponding to the relative position of a point within the mouse constituting the point of contact with said flat surface; and
- tracing manually a complex curve or profile from a drawing or photograph on said flat surface with said mouse by following said curve or profile with a tracing element which is laterally displaced from said point of contact to simultaneously input said complex curve or profile into said computer in accordance with signals generated by the mouse.

28. A method as defined in claim 27, additionally comprising installing the tracing element in the form of a pointer in a fixed position relative to said mouse and said receiving bracket, said pointer being located just above said flat surface for use in tracing exactly along said complex curve or profile.

29. A method of translating a complex curve or profile from a drawing or photograph into a computer, comprising the steps of:
mounting one end of a mechanical drafting machine arm onto a table or other flat surface defined by two orthogonal lines;
providing a receiving bracket on the other end of said mechanical drafting machine arm, said receiving bracket maintaining a fixed angular relationship with respect to said two orthogonal lines defining said flat surface as it is moved over said surface;
mounting a computer mouse fixedly on said receiving bracket to allow said mouse to rest on said flat surface and to move freely with said receiving bracket on said flat surface;
tracing manually a complex curve or profile from a drawing or photograph on said flat surface with said mouse to simultaneously input said complex curve or profile into said computer;
installing tracing means in the form of a pointer in a fixed position relative to said mouse and said receiving bracket, said pointer being located just above said flat surface for use in tracing exactly along said complex curve or profile; and
illuminating the pointer and an adjacent surface area during the tracing step.

30. A method of copying a complex curve or profile from a drawing or photograph into a computer using a computer mouse, which mouse is a translational device including a rotatable ball for contacting a flat surface and generating signals for application to a computer which are indicative of the instantaneous relative position of an actual pointer which is the point of contact of said ball with said surface, the method comprising the steps of:
attaching a pointer on an edge of said mouse, thereby establishing a line between said pointer and the actual pointer of said mouse;
tracing said complex curve or profile with said edge pointer to input a locus representing said complex curve or profile from said drawing or photograph into said computer in accordance with the signals generated by the mouse; and
simultaneously with said tracing step, maintaining said line in a fixed angular relationship with respect to two orthogonal lines coplanar with said drawing or photograph.

31. A method as defined in claim 30 wherein said maintaining step comprises supporting said mouse from a mechanical drawing arm to maintain said fixed angular relationship.

* * * * *